(12) United States Patent
Newstadt et al.

(10) Patent No.: US 10,887,307 B1
(45) Date of Patent: Jan. 5, 2021

(54) SYSTEMS AND METHODS FOR IDENTIFYING USERS

(71) Applicant: CA, INC., San Jose, CA (US)

(72) Inventors: Keith Newstadt, West Newton, MA (US); Ilya Sokolov, Boston, MA (US)

(73) Assignee: CA, INC., San Jose, CA (US)

( * ) Notice: Subject to any disclaimer, the term of this patent is extended or adjusted under 35 U.S.C. 154(b) by 214 days.

(21) Appl. No.: 16/018,044

(22) Filed: Jun. 25, 2018

(51) Int. Cl.
*H04L 29/06* (2006.01)

(52) U.S. Cl.
CPC ...... *H04L 63/0876* (2013.01); *H04L 63/1416* (2013.01); *H04L 63/20* (2013.01)

(58) Field of Classification Search
CPC .. H04L 63/0876; H04L 63/1416; H04L 63/20
USPC .......................................................... 726/7
See application file for complete search history.

(56) References Cited

U.S. PATENT DOCUMENTS

| 2010/0125635 | A1* | 5/2010 | Axelrod | H04L 63/0838 709/206 |
|---|---|---|---|---|
| 2016/0241398 | A1* | 8/2016 | Lewis | H04L 9/0891 |
| 2017/0244730 | A1* | 8/2017 | Sancheti | H04L 63/0245 |
| 2018/0084012 | A1* | 3/2018 | Joseph | H04L 63/1425 |

OTHER PUBLICATIONS

Liu, et al., "MACA: A privacy-preserving multi-factor cloud authentication system utilizing big data", doi: 10.1109/INFCOMW.2014.6849285, 2014, pp. 518-523. (Year: 2014).*
Banyal et al., "Multi-factor Authentication Framework for Cloud Computing", doi: 10.1109/CIMSim.2013.25, 2013, pp. 105-110. (Year: 2013).*

* cited by examiner

*Primary Examiner* — Peter C Shaw
(74) *Attorney, Agent, or Firm* — FisherBroyles, LLP (57) ABSTRACT

The disclosed computer-implemented method for identifying users may include (i) detecting that a user at an endpoint computing device is connecting to an identity provider, (ii) detecting, after detecting that the user at the endpoint computing device is connecting to the identity provider, that a mobile device has received a second-factor authentication message, (iii) discovering, by a security service, that the user at the endpoint computing device matches a known user profile registered to the mobile device by correlating the user at the endpoint computing device connecting to the identity provider with the mobile device receiving the second-factor authentication message, and (iv) applying a security policy to the user at the endpoint computing device based on the known user profile matched to the user by the security service. Various other methods, systems, and computer-readable media are also disclosed.

20 Claims, 7 Drawing Sheets

SYSTEMS AND METHODS FOR IDENTIFYING USERS

BACKGROUND

User behavioral analysis is a key component of monitoring the security of a network. Network traffic will inform a security analyst about what is happening on the network overall, but the security analyst may also benefit from learning which users are initiating specific instances of network traffic. This would further enable the security analyst to learn whether that specific network traffic should be considered normal or, instead, an indicator of a security compromise.

In some typical scenarios, network users are correlated with endpoint computing devices using authentication data that is retrieved from a network service such as LIGHTWEIGHT DIRECTORY ACCESS PROTOCOL or ACTIVE DIRECTORY. Nevertheless, both applications as well as the authentication procedures for these applications are increasingly transitioning over to a cloud service environment. Accordingly, when an employee of a corporate enterprise organization sits down at a corporate terminal to login to a cloud service, the information that would help the security analyst associate the employee with that corporate terminal for the login session may not be accessible to the security analyst and/or a corresponding analytics system. Without this further information, user behavior analysis cannot be performed in an optimal manner, as discussed in more detail below. The instant disclosure, therefore, identifies and addresses a need for improved systems and methods for identifying users.

SUMMARY

As will be described in greater detail below, the instant disclosure describes various systems and methods for identifying users. In one example, a computer-implemented method for identifying users may include (i) detecting that a user at an endpoint computing device is connecting to an identity provider, (ii) detecting, after detecting that the user at the endpoint computing device is connecting to the identity provider, that a mobile device has received a second-factor authentication message, (iii) discovering, by a security service, that the user at the endpoint computing device matches a known user profile registered to the mobile device by correlating the user at the endpoint computing device connecting to the identity provider with the mobile device receiving the second-factor authentication message, and (iv) applying a security policy to the user at the endpoint computing device based on the known user profile matched to the user by the security service.

In some examples, the computer-implemented method may further include detecting that the user at the endpoint computing device visited a cloud service prior to connecting to the identity provider. In one embodiment, the cloud service redirected the endpoint computing device from the cloud service to the identity provider via an authentication protocol. In one embodiment, the second-factor authentication message may include (i) a push notification, (ii) a SHORT MESSAGE SERVICE message, and/or (iii) a phone call.

In one embodiment, the second-factor authentication message is detected by (i) monitoring network communications at a network layer of the OPEN SYSTEMS INTERCONNECTION MODEL, (ii) intercepting SHORT MESSAGE SERVICE messages, (iii) receiving notifications of activity at the mobile device, (iv) identifying a phone number used by the identity provider, (v) reading contents of a screen of the mobile device, and/or (vi) identifying when a smart token application switches to an active state. In some examples, correlating the user at the endpoint computing device connecting to the identity provider with the mobile device receiving the second-factor authentication message is performed based on the mobile device communicating with the identity provider after receiving the second-factor authentication notification.

In some examples, correlating the user at the endpoint computing device connecting to the identity provider with the mobile device receiving the second-factor authentication message is performed based on the endpoint computing device receiving traffic from the identity provider after the mobile device received the second-factor authentication message. In some examples, correlating the user at the endpoint computing device connecting to the identity provider with the mobile device receiving the second-factor authentication message is performed based on the endpoint computing device connecting to a cloud service after the mobile device received the second-factor authentication message.

In some examples, correlating the user at the endpoint computing device connecting to the identity provider with the mobile device receiving the second-factor authentication message is performed based on collected state information that may include (i) a source INTERNET PROTOCOL address, (ii) a subnet, (iii) a Wi-Fi connection point, (iv) a network switch to which the endpoint computing device connects, (v) a virtual private network to which the endpoint computing device connects, (vi) a geolocation, and/or (vii) a connection between the endpoint computing device and the mobile device. In some examples, applying the security policy includes performing a security action to protect a computing resource from a threat associated with the user at the endpoint computing device.

In one embodiment, a system for implementing the above-described method may include (i) a detection module, stored in memory, that detects that a user at an endpoint computing device is connecting to an identity provider and that further detects, after detecting that the user at the endpoint computing device is connecting to the identity provider, that a mobile device has received a second-factor authentication message, (ii) a discovery module, stored in memory, that discovers, as part of a security service, that the user at the endpoint computing device matches a known user profile registered to the mobile device by correlating the user at the endpoint computing device connecting to the identity provider with the mobile device receiving the second-factor authentication message, (iii) an application module, stored in memory, that applies a security policy to the user at the endpoint computing device based on the known user profile matched to the user by the security service, and (iv) at least one physical processor configured to execute the detection module, the discovery module, and the application module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect that a user at an endpoint computing device is connecting to an identity provider, (ii) detect, after detecting that the user at the endpoint computing device is connecting to the identity provider, that a mobile device has received a second-factor authentication message, (iii) discover, by a security service, that the user at the endpoint computing device matches a known user profile registered to the mobile device by correlating the user at the endpoint computing device connecting to the identity provider with the mobile device receiving the second-factor authentication message, and (iv) apply a security policy to the user at the endpoint computing device based on the known user profile matched to the user by the security service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying users. The disclosed subject matter may improve upon related systems by enabling a security service to newly discover the identity of a user logging into a cloud service from an endpoint computing device. In general, the disclosed subject matter may enable security services to correlate known users who have registered their mobile devices with a security program with previously anonymous users interacting with cloud services through different endpoint computing devices. Accordingly, by learning the identities of the users at the endpoint computing devices who are interacting with the cloud services, security analysts and services may thereby perform behavioral analysis of network traffic and identify anomalous network traffic indicating a potential security threat, as discussed further below.

Figure 1:
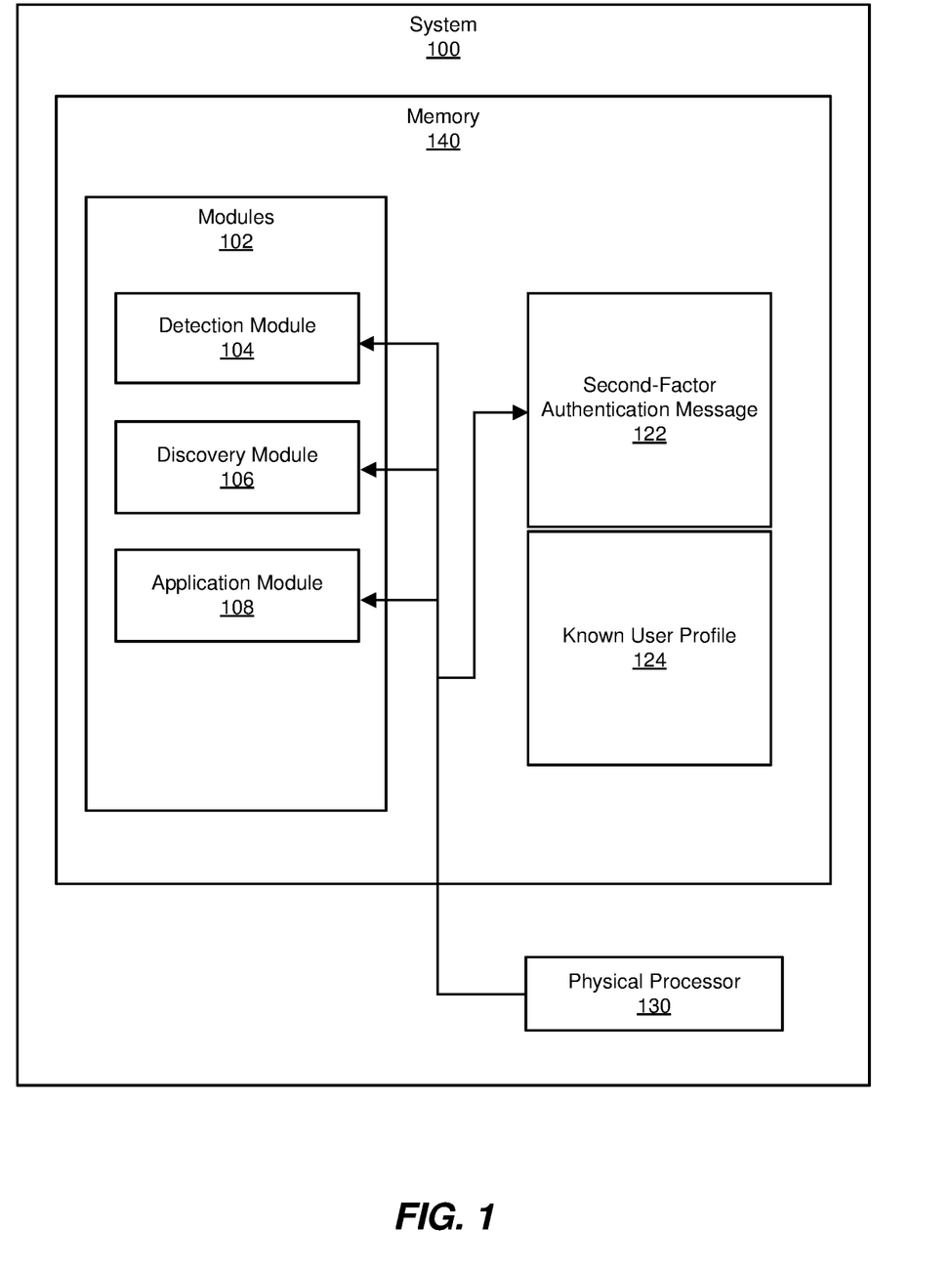
FIG. 1 is a block diagram of an example system for identifying users.
Figure 2:
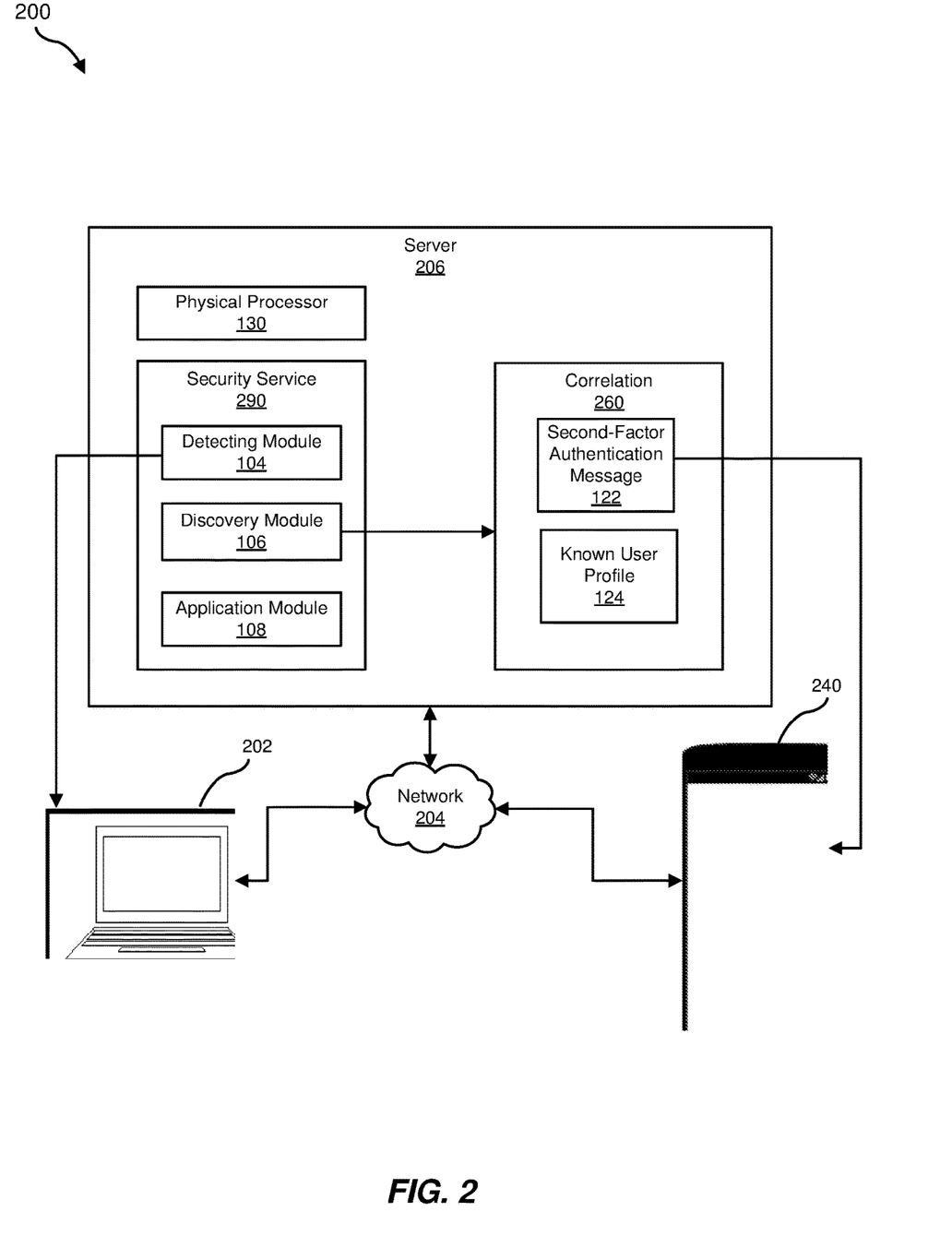
FIG. 2 is a block diagram of an additional example system for identifying users.

The following will provide, with reference to FIGS. 1-2, detailed descriptions of example systems for identifying users. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for identifying users. As illustrated in this figure, example system 100 may include one or more modules 102 for performing one or more tasks. For example, and as will be explained in greater detail below, example system 100 may include a detection module 104 that detects that a user at an endpoint computing device is connecting to an identity provider. Detection module 104 may also detect, after detecting that the user at the endpoint computing device is connecting to the identity provider, that a mobile device has received a second-factor authentication message, such as a second-factor authentication message 122. Example system 100 may additionally include a discovery module 106 that discovers, as part of a security service, that the user at the endpoint computing device matches a known user profile, such as a known user profile 124, registered to the mobile device by correlating the user at the endpoint computing device connecting to the identity provider with the mobile device receiving the second-factor authentication message. Example system 100 may also include an application module 108 that applies a security policy to the user at the endpoint computing device based on the known user profile matched to the user by the security service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying users. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to identify users.

Figure 4:
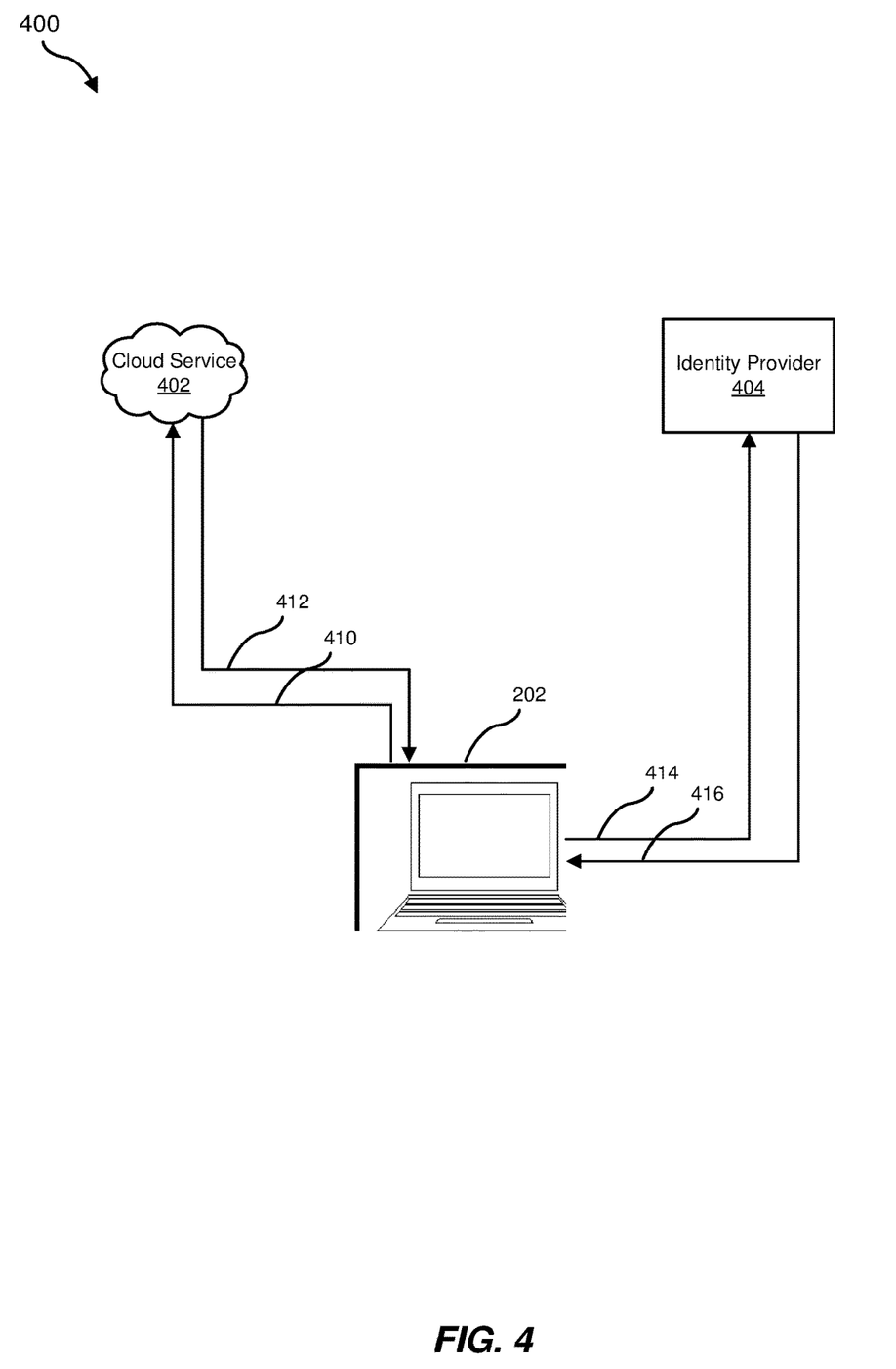
FIG. 4 is a block diagram of an example workflow corresponding to the example method for identifying users.

For example, and as will be described in greater detail below, detection module 104 may detect that a user at an endpoint computing device, such as computing device 202, is connecting to an identity provider. In one illustrative example, the identity provider may include an identity provider 404 that is shown in FIG. 4 and discussed in more detail below in connection with that figure. Detection module 104 may detect, after detecting that the user at computing device 202 is connecting to the identity provider, that a mobile device 240 has received a second-factor authentication message 122. Discovery module 106 may discover, as part of a security service 290, that the user at computing device 202 matches a known user profile registered to mobile device 240 by correlating the user at computing device 202 connecting to the identity provider with mobile device 240 receiving second-factor authentication message 122, thereby indicating a correlation 260. Application module 108 may apply a security policy to the user at the endpoint computing device 202 based on the known user profile matched to the user by the security service.

Computing device 202 generally represents any type or form of computing device capable of reading computer-executable instructions. In one illustrative example, computing device 202 may correspond to a corporate terminal for employees within a corporate enterprise organization. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300 or facilitating the performance of method 300. In one illustrative example, server 206 corresponds to a security backend server of a security vendor that monitors network traffic to perform behavioral analysis and identify anomalous network traffic potentially indicating a security threat, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
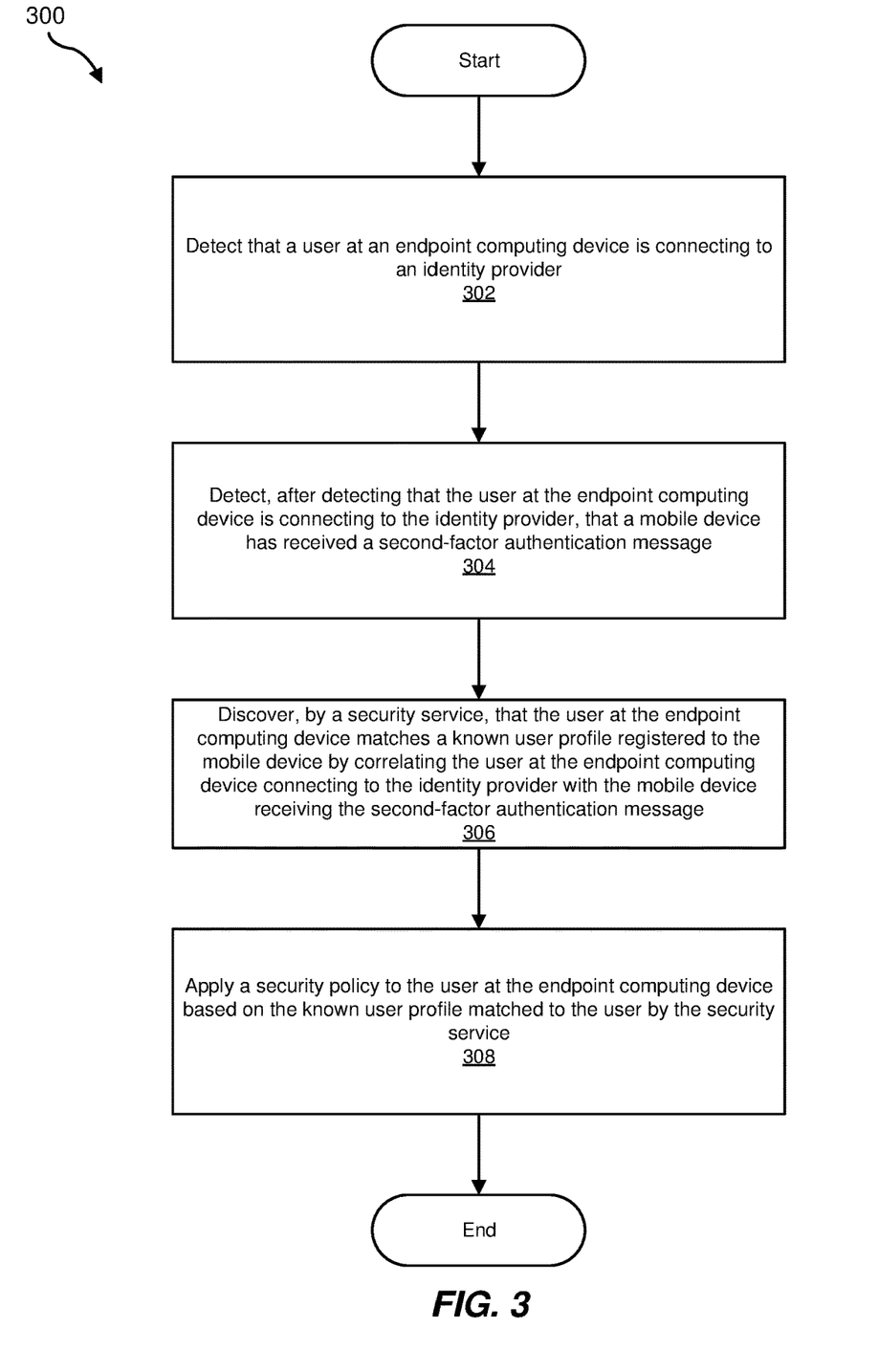
FIG. 3 is a flow diagram of an example method for identifying users.

FIG. 3 is a flow diagram of an example computer-implemented method 300 for identifying users. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect that a user at an endpoint computing device is connecting to an identity provider. For example, detection module 104 may, as part of server 206 in FIG. 2, detect that a user at an endpoint computing device 202 is connecting to an identity provider.

As used herein, the term "identity provider" generally refers to an identification service that verifies the user's identity. In some examples, the identity provider may correspond to a third-party identification service that performs the verification function to verify that an identity presented by one party to another party is authentic. In further examples, the identity provider may optionally charge a fee for performing the verification function. In general, the identity provider may enable a cloud service to identify and authenticate corresponding users who attempt to access and utilize the cloud service. Moreover, as used herein, the term "endpoint computing device" generally refers to any computing device manually operated by a user in accordance with method 300, as discussed further below.

Detection module 104 may detect that a user at the endpoint computing device is connecting to the identity provider in a variety of ways. In general, detection module 104 may detect that the user at the endpoint computing device is connecting to the identity provider by monitoring network traffic. For example, detection module 104 may detect that the endpoint computing device has been transmitted a network packet to, or received the network packet from, a network address that corresponds to the identity provider. In some examples, the network address may include a uniform resource locator.

In some examples, detection module 104 may detect that the user at the endpoint computing device visited a cloud service prior to connecting to the identity provider. FIG. 4 illustrates an example workflow 400 corresponding to method 300 of FIG. 3. As further shown in FIG. 4, a user at computing device 202 may, at step 410, visit cloud service 402. As one illustrative example, a cloud service 402 may correspond to SALESFORCE.COM. Detection module 104 may detect that the user at computing device 202 is visiting cloud service 402 by monitoring network traffic. For example, detection module 104 may detect that computing device 202 has, at step 410, transmitted a network packet that is directed to the domain SALESFORCE.COM and/or a network address previously associated with SALESFORCE.COM.

Additionally, in some examples, cloud service 402 may redirect the endpoint computing device from cloud service 402 to the identity provider, such as identity provider 404, via an authentication protocol. Returning to FIG. 4, at step 412, cloud service 402 may transmit one or more reply network packets to computing device 202. These reply network packets may optionally redirect computing device 202 (e.g., redirect the user session and/or web navigation at computing device 202) to identity provider 404. Identity provider 404 may provide a third-party identification function that enables cloud service 402 to identify/authenticate corresponding users, such as the user at computing device 202, as discussed further above. Accordingly, at step 414, computing device 202 may transmit one or more network packets to identity provider 404 and, in response, identity provider 404 may optionally transmit one or more reply network packets at step 416, as further shown in FIG. 4. In general, the network packets at step 414 and step 416 may correspond to the authentication procedure provided by identity provider 404 that enables cloud service 402 to identify/authenticate a corresponding user. As one illustrative example, identity provider 404 may correspond to OKTA.COM.

In some examples, detection module 104 may detect that the user visits the cloud service and/or that the user interacts with the identity provider through detection module 104 for interfacing with the firewall, virtual private network, intrusion detection's system, and/or network sniffer. In general, detection module 104 may detect a domain name associated with the cloud service and/or the identity provider to which the user at computing device 202 is attempting to connect or access. In some examples, detection module 104 may detect one or more of these items of information even if the corresponding network connection is encrypted, such as encrypted according to the TRANSPORT LAYER SECURITY protocol.

At step 304, one or more of the systems described herein may detect, after detecting that the user at the endpoint computing device is connecting to the identity provider, that a mobile device has received a second-factor authentication message. For example, detection module 104 may, as part of server 206 in FIG. 2, detect, after detecting that the user at computing device 202 is connecting to identity provider 404, that mobile device 240 has received second-factor authentication message 122.

As used herein, the term "second-factor authentication message" generally refers to any message or telephone call transmitted as part of a second-factor authentication procedure. Moreover, a second-factor authentication procedure may correspond in some examples to an authentication procedure that requests that a user demonstrate possession of an additional credential, such as a physical possession (e.g., a registry mobile device), in addition to an original credential, such as a basic password. In some illustrative examples, the second-factor authentication message may include at least one of: (i) a push notification, (ii) a SHORT MESSAGE SERVICE message, and/or (iii) a phone call.

Figure 5:
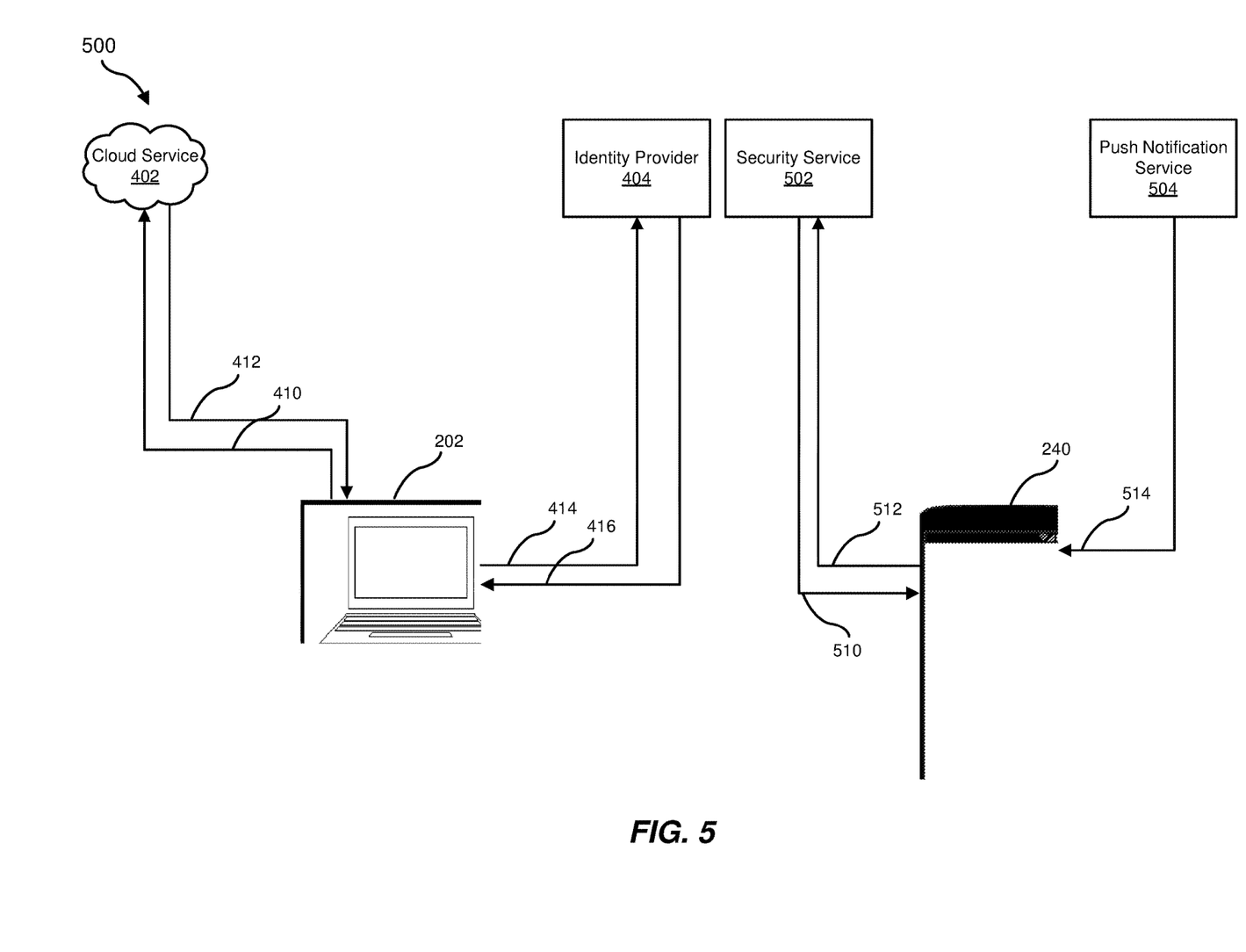
FIG. 5 is a block diagram of an expanded example workflow corresponding to the example method for identifying users.

FIG. 5 shows an expanded workflow 500 corresponding to method 300 of FIG. 3. As further shown in FIG. 5, workflow 500 may include step 410, step 412, step 414, and step 416, as described further above in more detail regarding FIG. 4 and step 302 of method 300. Additionally, and subsequent to the performance of step 410, step 412, step 414, and step 416 (one or more of the steps may be optional), the security service 502 may transmit second-factor authentication message 122 to mobile device 240 at step 510. In response, at step 512, the user at mobile device 240 may respond to the second-factor authentication message 122.

For example, second-factor authentication message 122 may include a one-time password. Accordingly, at step 512, the user of the mobile device 240 may optionally use this one-time password at computing device 202 to login to identity provider 404 and/or security service 502. In general, detection module 104 may detect network traffic between mobile device 240 and security service 502 at step 510 and step 512, thereby indicating that the user of mobile device 240 is potentially performing a second-factor authentication procedure. For example, detection module 104 may detect network traffic to, or from, a network address corresponding to security service 502, such as a network address for SYMANTEC VALIDATION AND IDENTITY PROTECTION (VIP) at https://vip.symantec.com.

As further shown in FIG. 5, in some examples workflow 500 may optionally include an additional step 514, in which case a push notification service 504 may transmit a push notification as second-factor authentication message 122 to the user at mobile device 240. In some examples, push notification service 504 may correspond to a push notification service provided by an operator of a mobile device operating system environment, such as GOOGLE providing a push notification service through the ANDROID operating system environment and/or APPLE providing a push notification service through the IOS and/or related product line operating system environment. In these examples, security service 502 may optionally leverage push notification service 504 to transmit second-factor authentication message 122 through internal and streamlined push notification functionality, rather than security service 502 transmitting the second-factor authentication message itself.

In some examples, security service 502 may include the same security service performing the correlating and matching functionality of method 300, as discussed below in more detail regarding step 306. In other examples, security service 502 may include a second and distinct security service that transmits the second-factor authentication message, as detected by a different security service performing method 300.

Detection module 104 may detect that the mobile device has received the second-factor authentication message in a variety of ways. In one embodiment, detection module 104 detects the second-factor authentication message by monitoring network communications at a network layer of the OPEN SYSTEMS INTERCONNECTION MODEL. In these examples, detection module 104 may detect a network packet at the network layer that includes the second-factor authentication message. Additionally or alternatively, detection module 104 may detect that the mobile device has received the second-factor authentication message by intercepting SHORT MESSAGE SERVICE messages. For example, in the case that the second-factor authentication message includes a SHORT MESSAGE SERVICE message, detection module 104 may have been previously configured to monitor for and detect the transmission of these messages. Similarly, in some examples detection module 104 may be configured to receive scheduled or continuous notifications of activity at mobile device 240. In these examples, the notifications of the activity at mobile device 240 may indicate an instance of activity corresponding to mobile device 240 receiving the second-factor authentication message. Furthermore, in some examples, detection module 104 may detect telephone and/or messaging activity at mobile device 240 that is originating from a phone number previously registered to, or associated with, identity provider 404.

Additionally, in some examples detection module 104 may detect the mobile device 240 has received the second-factor authentication message by performing a screen-scraping operation to parse more and more instances of content displayed at mobile device 240, or reviewing content displayed at mobile device 240. In these examples, the content displayed at mobile device 240 may include the second-factor authentication message and/or an indication that mobile device 240 has received the second-factor authentication message. As an additional example, detection module 104 may also optionally detect that mobile device 240 has received the second-factor authentication message by further detecting that a smart token application at mobile device 240 has switched to an active state. In general, detection module 104 may detect that mobile device 240 has received the second-factor authentication message using any suitable permutation of one or more of the various techniques listed above.

At step 306, one or more of the systems described herein may discover, by a security service, that the user at the endpoint computing device matches a known user profile registered to the mobile device by correlating the user at the endpoint computing device connecting to the identity provider with the mobile device receiving the second-factor authentication message. For example, discovery module 106 may, as part of server 206 managed by a security service 290, that the user at computing device 202 matches known user profile 124 registered to mobile device 240 by correlating the user at computing device 202 connecting to identity provider 404 with mobile device 240 receiving second-factor authentication message 122.

Discovery module 106 may discover that the user at computing device 202 matches known user profile 124 in a variety of ways. In general, as used herein, the phrase "matches" or "matching" indicates that a corresponding security service, such as security service 502, is discovering an identity of the user at computing device 202 by matching, linking, associating, and/or correlating the user at computing device 202 to the user of mobile device 240, which was previously registered with security service 502.

In some examples, discovery module 106 may discover that the user at computing device 202 matches known user profile 124 by correlating the detecting of the interaction between the user at computing device 202 with cloud service 402 and/or identity provider 404, at step 302, with the second-factor authentication procedure detected at step 304. For example, discovery module 106 may measure a degree of time or latency between these two events. Discovery module 106 may further determine that the degree of time or latency satisfies a threshold indicating that the two events are sufficiently proximate to each other to indicate correlation or causation.

More generally, discovery module 106 may reference or construct a model for network traffic in a scenario where the user at computing device 202 and the user at mobile device 240 are the same, and the user at mobile device 240 is performing a second-factor authentication procedure in order to further access cloud service 402 through computing device 202. Subsequently, discovery module 106 may perform step 306 by measuring a degree to which detecting network traffic matches, or conforms to, the model of network traffic for this scenario. Accordingly, in these examples, the model for the network traffic may indicate a multiplicity of different attributes. Furthermore, discovery module 106 in these examples may check each of these different attributes to determine which of them as identified in the current performance of method 300. Each attribute that is consistent with, or conforms to, the model of network traffic further confirms that the user at computing device 202 matches the user at mobile device 240. For example, discovery module 106 may calculate a confidence score that indicates a measurement of confidence in a conclusion that the user at computing device 202 matches the user at mobile device 240. In these examples, each attribute that is consistent with, or conforms to, the model of network traffic may proportionally increase, or adjust upward, the confidence score indicating a proportionally higher degree of confidence. Moreover, in some examples a multitude of different users may be interacting with computing device 202 over a short period of time, thereby decreasing a calculated confidence score that the user at computing device 202 and the user at mobile device 240 are the same.

In some examples, discovery module 106 may correlate the user at the endpoint computing device connecting to the identity provider with the mobile device receiving the second-factor authentication message based on one or more of the following factors. Each of these factors may correspond to an attribute of the model of network traffic that is based on the scenario where the user at computing device 202 and the user at mobile device 240 are the same, and the user at mobile device 240 is performing a second-factor authentication procedure to enable the user at computing device 202 to login to a cloud service 402. For example, one of the factors may be that the mobile device authenticates with the identity provider, such as identity provider 404, after the mobile device receives the second-factor authentication message. Additionally or alternatively, another factor may be that the endpoint computing device receives traffic from the identity provider after the mobile device receives the second-factor authentication message. Furthermore, alternatively, another factor may be that the endpoint computing device successfully connected to the cloud service, rather than simply visiting or interacting with the cloud service, after the mobile device received the second-factor authentication message.

In some examples, these events may happen in the following order: the mobile device first communicates with the identity provider over a network, such as network 204, after the mobile device receives the second-factor authentication message, subsequently the endpoint computing device, such as computing device 202 receives traffic from the identity provider, and then subsequently to that the endpoint computing device successfully connects to the cloud service. Accordingly, discovery module 106 may optionally base correlation at least in part on detecting two or three of these events happening in the correct order outlined above.

More generally, discovery module 106 may establish a fundamental correlation between the user computing device 202 interacting with the cloud service and/or the identity provider, on the one hand, and the user at mobile device 240 receiving the second-factor authentication message and/or completing the second type factor authentication procedure. Additionally, discovery module 106 may also correlate one or more additional events with these two events. For example, discovery module 106 may correlate any one or more of the steps shown in FIG. 4 and FIG. 5 with each other, in accordance with a model of network traffic according to the scenario where the user at computing device 202 and the user at mobile device 240 are the same, as further outlined above. In these examples, discovery module 106 may optionally situate, insert, and/or map one or more of these detected events to a specific location within the model of expected network behavior.

Additionally, in some examples discovery module 106 may reference a trained machine learning model. For example, a security analyst or security service may have previously performed numerous instances of a user interacting with the cloud service and/or identity provider while also performing a second-factor authentication procedure with a mobile device. The security analyst or security service may also optionally obtain network traffic corresponding to a volume of scenarios where the correlation does not hold (e.g., true negatives). Accordingly, the security analyst or security service may gather a volume of illustrative network traffic as training data to train a machine learning model to detect instances of these correlations, and to distinguish between situations where the correlation holds and situations where the correlation does not hold. Subsequently, discovery module 106 may apply the trained machine learning model to distinguish between situations where the correlation does hold and situations where a correlation does not hold.

Each of these attributes, or network events, listed above may correspond to expected attributes or events that would be predicted according to the model of network traffic in the scenario where the user at mobile device 240 is performing a second-factor authentication procedure to enable the same user at computing device 202 to login to cloud service 402. Accordingly, discovery module 106 detecting any one or more of these attributes may proportionally increase a confidence score calculated to measure the degree of confidence that the user at computing device 202 for step 302 and step 304 matches, or correlates with, the user at mobile device 240 for step 304, as further described above.

Additionally or alternatively, discovery module 106 may further base correlation between the user at computing device 202 and the user at mobile device 240 on any permutation of one or more of the following factors. For example, discovery module 106 may base the correlation on a source INTERNET PROTOCOL address for computing device 202, mobile device 240, and/or measurement of proximity or relatedness between these two addresses. Additionally or alternatively, discovery module 106 may base the correlation further on a subnet to which the user at computing device 202 and/or mobile device 240 is connecting. Furthermore, alternatively, discovery module 106 may base the correlation on a Wi-Fi connection point, such as by detecting that both computing device 202 and/or mobile device 240 are connected to the same Wi-Fi connection point.

Similarly, discovery module 106 may base the correlation on a network switch to which the endpoint computing device and/or the mobile computing device are connected, especially in the case that they are connected to the same network switch. Furthermore, discovery module 106 may base the correlation on a virtual private network to which the endpoint computing device and/or the mobile device connects. Similarly, in some examples discovery module 106 may detect a geolocation of computing device 202 and/or mobile device 240. In these examples, discovery module 106 may further measure a degree of proximity or relatedness between two or more of these geolocations, thereby detecting a correlation or association between computing device 202 and mobile device 240. Lastly, in some examples, discovery module 106 may detect a direct connection between computing device 202 and mobile device 240 over any suitable wired or wireless connection mechanism. In general, discovery module 106 may support or strengthen the correlation between the user at computing device 202 and the user at mobile device 240 based on any additional correlation, relationship, association, link, and/or proximity between two respective attributes for computing device 202 and mobile device 240, such as a network connection (Wi-Fi, Bluetooth, near field, etc.) between the two devices, a physical proximity between these two devices, and/or a mutual network address or network resource to which both devices are directly or indirectly connected, etc.

At step 308, one or more of the systems described herein may apply a security policy to the user at the endpoint computing device based on the known user profile matched to the user by the security service. For example, application module 108 may, as part of server 206 in FIG. 2, apply a security policy to the user at the endpoint computing device 202 based on the known user profile matched to the user by the security service.

Application module 108 may apply the security policy to the user at the endpoint computing device in a variety of ways. In general, as used herein, the phrase "apply the security policy to the user" generally refers to performing any security action to protect a computing resource based on at least one item of information detected about the user. Furthermore, application module 108 may apply the security policy in response to one or more results of an instance of behavioral analysis performed by a security analyst and/or security service. For example, the security analyst and/or security service may detect that one or more instances of network activity associated with the user of computing device 202 is anomalous after detecting the actual identity of the user, in accordance with method 300, and comparing the instances of network activity with expected network activity for the actual identity of the user. In these cases, the security analyst and/or security service may perform one or more security actions to detect a corresponding computing resource, such as protecting the corresponding computing resource from a threat associated with the user at computing device 202. In some illustrative examples, the security action may include any permutation of one or more of the following: enabling or increasing a security measure or feature, disabling, quarantining, powering down, throttling, or deleting one or more of hardware, software, virtual, and social network resources, issuing an alert or warning to a user or administrator, and/or revoking or diminishing one or more access rights or privileges that a user (e.g., the user at computing device 202) previously possessed.

As further outlined above, the disclosed subject matter may improve upon related systems by enabling a security service to newly discover the identity of a user logging into a cloud service from an endpoint computing device. In general, the disclosed subject matter may enable security services to correlate known users who have registered their mobile devices with a security program with previously anonymous users interacting with cloud services through different endpoint computing devices. Accordingly, by learning the identities of the users at the endpoint computing devices who are interacting with the cloud services, security analysts and services may thereby perform behavioral analysis of network traffic and identify anomalous network traffic indicating a potential security threat.

Figure 6:
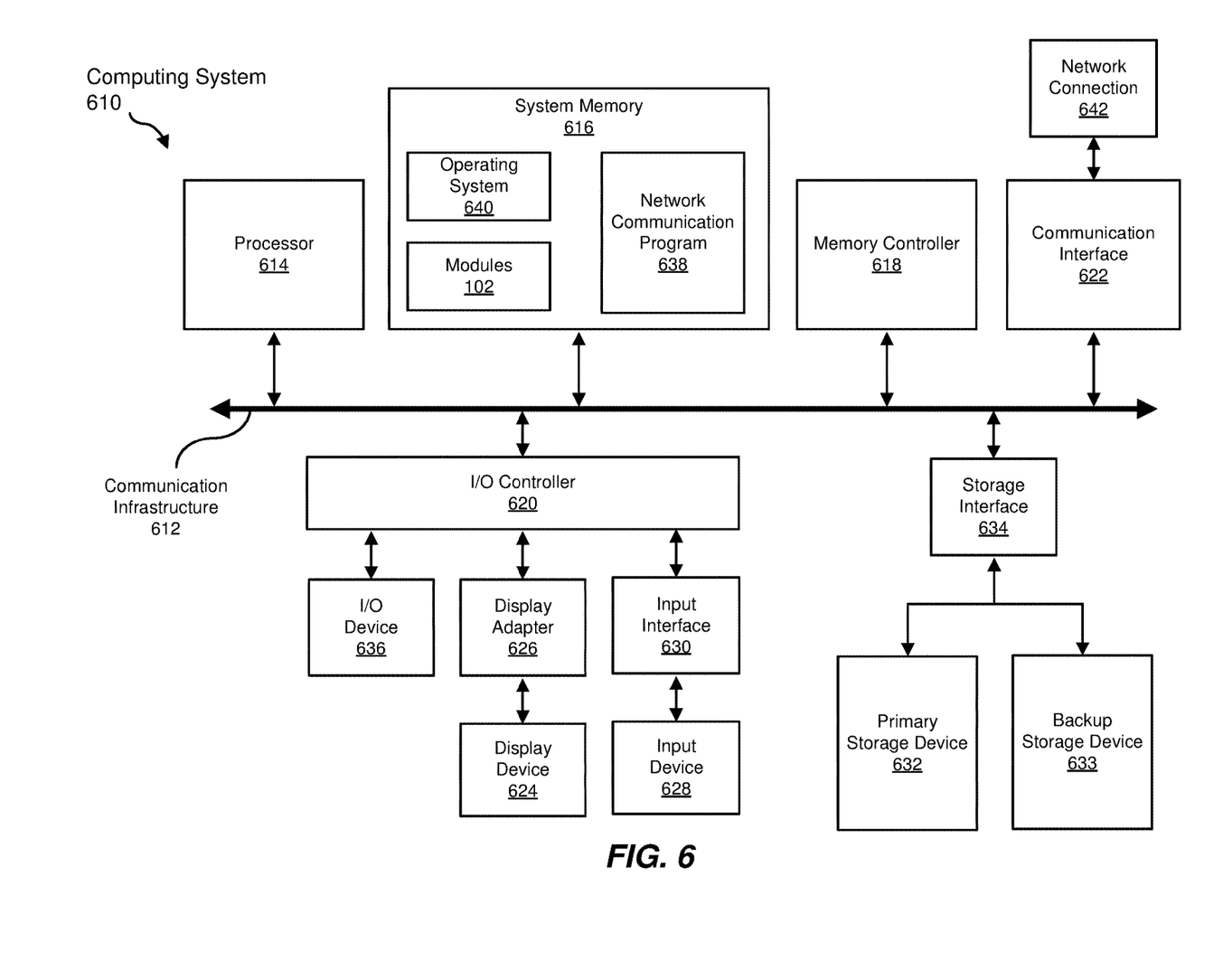
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
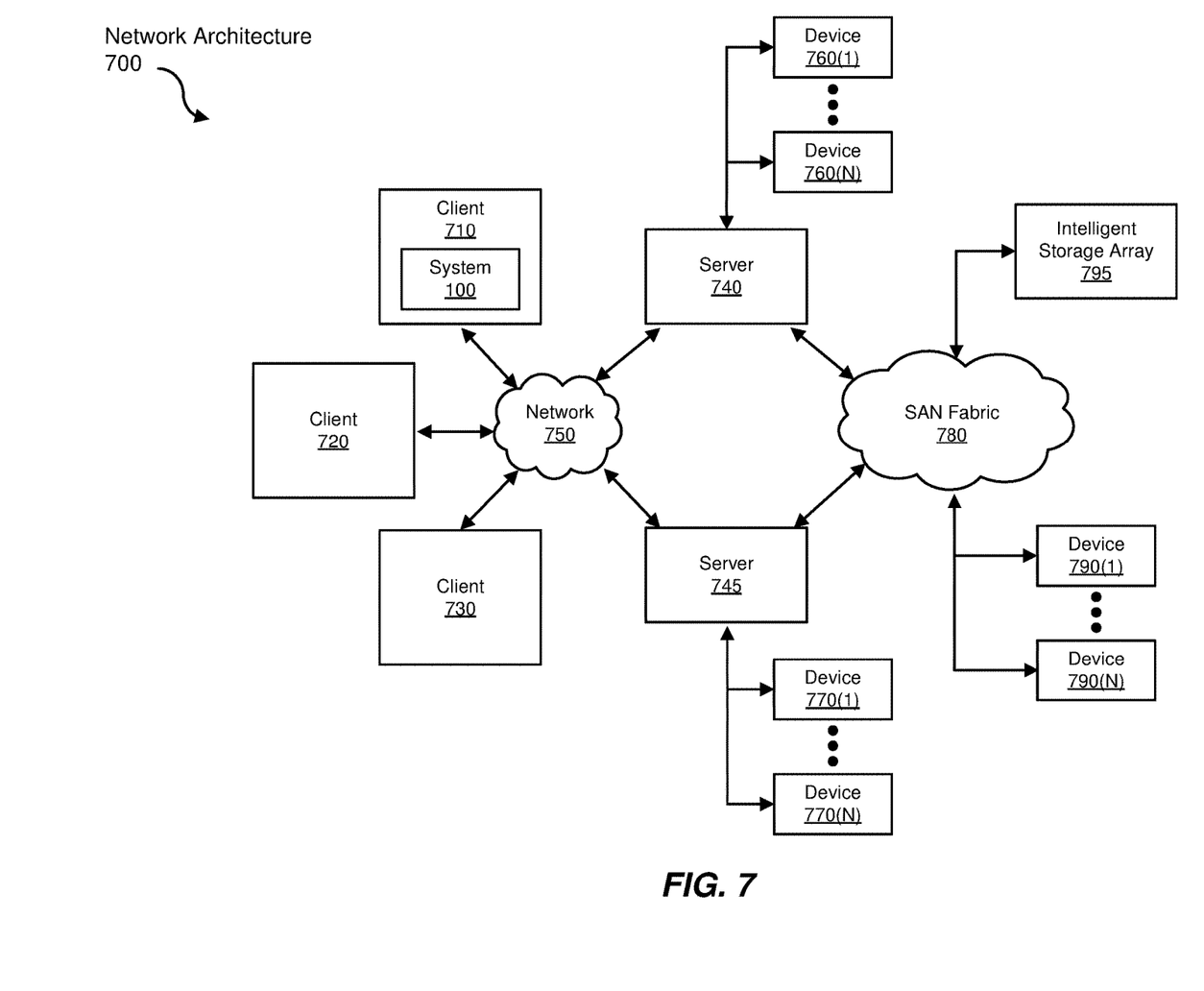
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules described herein may transform an identifier for a user indicating that the user is anonymous into a transformed identifier for a user that links the user to a known user profile that was previously registered to a mobile device, as discussed further above in connection with method 300 of FIG. 3. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying users, at least a portion of the method being performed by a computing device comprising at least one processor, the method comprising:
   detecting that a user at an endpoint computing device is connecting to an identity provider;
   detecting, after detecting that the user at the endpoint computing device is connecting to the identity provider, that a mobile device has received a second-factor authentication message;
   discovering, by a security service, that the user at the endpoint computing device matches a known user profile registered to the mobile device by correlating the user at the endpoint computing device connecting to the identity provider with the mobile device receiving the second-factor authentication message;
   applying a security policy to the user at the endpoint computing device based on the known user profile matched to the user by the security service; and
   detecting that the user at the endpoint computing device visited a cloud service prior to connecting to the identity provider.

2. The computer-implemented method of claim 1, wherein the second-factor authentication message comprises a push notification.

3. The computer-implemented method of claim 1, wherein the cloud service redirected the endpoint computing device from the cloud service to the identity provider via an authentication protocol.

4. The computer-implemented method of claim 1, wherein the second-factor authentication message comprises at least one of:
   a SHORT MESSAGE SERVICE message; and
   a phone call.

5. The computer-implemented method of claim 1, wherein the second-factor authentication message is detected by at least one of:
monitoring network communications at a network layer of the OPEN SYSTEMS INTERCONNECTION MODEL;
intercepting SHORT MESSAGE SERVICE messages;
receiving notifications of activity at the mobile device;
identifying a phone number used by the identity provider;
reading contents of a screen of the mobile device; and
identifying when a smart token application switches to an active state.

6. The computer-implemented method of claim 1, wherein correlating the user at the endpoint computing device connecting to the identity provider with the mobile device receiving the second-factor authentication message is performed based on the mobile device communicating with the identity provider after receiving the second-factor authentication message.

7. The computer-implemented method of claim 1, wherein correlating the user at the endpoint computing device connecting to the identity provider with the mobile device receiving the second-factor authentication message is performed based on the endpoint computing device receiving traffic from the identity provider after the mobile device received the second-factor authentication message.

8. The computer-implemented method of claim 1, wherein correlating the user at the endpoint computing device connecting to the identity provider with the mobile device receiving the second-factor authentication message is performed based on the endpoint computing device connecting to the cloud service after the mobile device received the second-factor authentication message.

9. The computer-implemented method of claim 1, wherein correlating the user at the endpoint computing device connecting to the identity provider with the mobile device receiving the second-factor authentication message is performed based on collected state information that comprises at least one of:
a source INTERNET PROTOCOL address;
a subnet;
a Wi-Fi connection point;
a network switch to which the endpoint computing device connects;
a virtual private network to which the endpoint computing device connects;
a geolocation; and
a connection between the endpoint computing device and the mobile device.

10. The computer-implemented method of claim 1, wherein applying the security policy comprises performing a security action to protect a computing resource from a threat associated with the user at the endpoint computing device.

11. A system for identifying users, the system comprising:
a detection module, stored in memory, that:
    detects that a user at an endpoint computing device is connecting to an identity provider; and
    detects, after detecting that the user at the endpoint computing device is connecting to the identity provider, that a mobile device has received a second-factor authentication message;
a discovery module, stored in memory, that discovers, as part of a security service, that the user at the endpoint computing device matches a known user profile registered to the mobile device by correlating the user at the endpoint computing device connecting to the identity provider with the mobile device receiving the second-factor authentication message;
an application module, stored in memory, that applies a security policy to the user at the endpoint computing device based on the known user profile matched to the user by the security service; and
at least one physical processor configured to execute the detection module, the discovery module, and the application module;
wherein the detection module is further configured to detect that the user at the endpoint computing device visited a cloud service prior to connecting to the identity provider.

12. The system of claim 11, wherein the second-factor authentication message comprises a push notification.

13. The system of claim 11, wherein the cloud service redirected the endpoint computing device from the cloud service to the identity provider via an authentication protocol.

14. The system of claim 11, wherein the second-factor authentication message comprises at least one of:
a SHORT MESSAGE SERVICE message; and
a phone call.

15. The system of claim 11, wherein the second-factor authentication message is detected by the detection module performing at least one of:
monitoring network communications at a network layer of the OPEN SYSTEMS INTERCONNECTION MODEL;
intercepting SHORT MESSAGE SERVICE messages;
receiving notifications of activity at the mobile device;
identifying a phone number used by the identity provider;
reading contents of a screen of the mobile device; and
identifying when a smart token application switches to an active state.

16. The system of claim 11, wherein the discovery module correlates the user at the endpoint computing device connecting to the identity provider with the mobile device receiving the second-factor authentication message at least in part based on the mobile device communicating with the identity provider after receiving the second-factor authentication message.

17. The system of claim 11, wherein the discovery module correlates the user at the endpoint computing device connecting to the identity provider with the mobile device receiving the second-factor authentication message at least in part based on the endpoint computing device receiving traffic from the identity provider after the mobile device received the second-factor authentication message.

18. The system of claim 11, wherein the discovery module correlates the user at the endpoint computing device connecting to the identity provider with the mobile device receiving the second-factor authentication message at least in part based on the endpoint computing device connecting to the cloud service after the mobile device received the second-factor authentication message.

19. The system of claim 11, wherein the discovery module correlates the user at the endpoint computing device connecting to the identity provider with the mobile device receiving the second-factor authentication message at least in part based on collected state information that comprises at least one of:
a source INTERNET PROTOCOL address;
a subnet;
a Wi-Fi connection point;
a network switch to which the endpoint computing device connects;

a virtual private network to which the endpoint computing device connects;
a geolocation; and
a connection between the endpoint computing device and the mobile device.

20. A non-transitory computer-readable medium comprising one or more computer-readable instructions that, when executed by at least one processor of a computing device, cause the computing device to:
- detect that a user at an endpoint computing device is connecting to an identity provider;
- detect, after detecting that the user at the endpoint computing device is connecting to the identity provider, that a mobile device has received a second-factor authentication message;
- discover, by a security service, that the user at the endpoint computing device matches a known user profile registered to the mobile device by correlating the user at the endpoint computing device connecting to the identity provider with the mobile device receiving the second-factor authentication message;
- apply a security policy to the user at the endpoint computing device based on the known user profile matched to the user by the security service; and
- detect that the user at the endpoint computing device visited a cloud service prior to connecting to the identity provider.

* * * * *